United States Patent
Bess et al.

(10) Patent No.: US 7,546,379 B2
(45) Date of Patent: *Jun. 9, 2009

(54) APPLICATION PRIORITIZATION IN A STATELESS PROTOCOL

(75) Inventors: Roger A. Bess, Apex, NC (US); Roberto Delima, Apex, NC (US); Sivaram Gottimukkala, Durham, NC (US); Jason Paul Hawrysz, Raleigh, NC (US); Lap Thiet Huynh, Apex, NC (US); Dinakaran B. Joseph, Durham, NC (US); John J. Majikes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/868,481

(22) Filed: Oct. 6, 2007

(65) Prior Publication Data

US 2008/0034052 A1 Feb. 7, 2008

Related U.S. Application Data

(63) Continuation of application No. 10/188,678, filed on Jul. 2, 2002, now Pat. No. 7,337,236.

(51) Int. Cl.
*G06F 15/173* (2006.01)
(52) U.S. Cl. .................................................... 709/240
(58) Field of Classification Search ............... 709/240, 709/223, 103, 105
See application file for complete search history.

(56) References Cited

U.S. PATENT DOCUMENTS

| | | | | |
|---|---|---|---|---|
| 5,974,465 A | * | 10/1999 | Wong | 709/234 |
| 6,006,269 A | * | 12/1999 | Phaal | 709/227 |
| 6,141,686 A | * | 10/2000 | Jackowski et al. | 709/224 |
| 6,249,668 B1 | * | 6/2001 | Abe et al. | 340/7.2 |
| 6,934,882 B2 | * | 8/2005 | Barthel et al. | 714/18 |
| 6,938,097 B1 | * | 8/2005 | Vincent et al. | 709/240 |
| 6,947,429 B1 | * | 9/2005 | Heiss et al. | 370/395.62 |

* cited by examiner

*Primary Examiner*—David Y Eng
(74) *Attorney, Agent, or Firm*—Marcia L. Doubet; Joseph E. Bracken

(57) ABSTRACT

Techniques are disclosed that enable an application to prioritize its traffic in an application-specific manner, such that traffic which is most important to this application can be prioritized over traffic that is less important to this application, where this prioritization information is reflected in differential treatment of the traffic within the network. An application conveys relative priority information for its traffic to a Web proxy or edge server, and this device then consults stored policy information to determine how the traffic should be prioritized in the network. The Web proxy also ensures that usage of network resources is balanced among multiple applications. Cookies are used for transmitting priority information between the edge server and application in an efficient manner.

10 Claims, 8 Drawing Sheets

ApplClass Cookie

Application_Name
Relative_Priority

QoS Cookie

QoS_Name
ToS
Client_Identifier
Client_Bandwidth
Encoded ApplClass Cookie
User_Identifier
Group_Identifier
Server_Domain_Identifier
Policy_Instance

APPLICATION PRIORITIZATION IN A STATELESS PROTOCOL

RELATED U.S. PATENT APPLICATIONS

This application claims priority as a continuation application from U.S. patent application Ser. No. 10/188,678, filed Jul. 2, 2002 (now U.S. Pat. No. 7,337,236), the disclosure of which is hereby incorporated herein by reference in its entirety. The present invention is related to the following commonly-assigned, co-pending U.S. patent applications, which are hereby incorporated herein by reference: U.S. Ser. No. 09/557,708, filed Apr. 25, 2000, entitled "URL-Based Sticky Routing Tokens Using a Server-Side Cookie Jar"; U.S. Ser. No. 09/825,078, filed Apr. 3, 2001, entitled "Quality of Service Improvements for Network Transactions" (now U.S. Pat. No. 7,213,071); and U.S. Ser. No. 09/904,025, filed Jul. 12, 2001, entitled "Method and Apparatus for Policy-Based Packet Classification" (now U.S. Pat. 7,308,501). These related inventions are referred to herein as the "first related invention", the "second related invention", and the "third related invention", respectively.

BACKGROUND OF THE INVENTION

1. Field of the Invention

The present invention relates to a computer system, and deals more particularly with methods, systems, and computer program products for prioritizing application traffic in a networking environment that uses a stateless protocol (such as the HyperText Transfer Protocol, or "HTTP").

2. Description of the Related Art

The popularity of electronic commerce ("e-commerce", also referred to as electronic business or "e-business"), or buying goods and services over a network such as the Internet, continues to increase at a tremendous pace. Estimates are that consumer electronic commerce transactions will grow from under $10 billion in 1998 to over $100 billion by 2003.

A particular business may participate in electronic commerce only with consumers (i.e., in business-to-consumer or "B2C" transactions), or only with other businesses (i.e., in business-to-business or "B2B" transactions). Or, a business may participate in electronic commerce for both B2C and B2B transactions.

Businesses that participate in the global e-commerce marketplace are driven by competitive stress to provide the best and most cost-effective value to prospective consumer clients and business partner clients. Within this highly-competitive business environment, the client's perception of the service provided becomes critical to a business's profitability and even the survival of its electronic marketplace, since the client is only "one click away" from a competitor's electronic marketplace. Accordingly, e-business establishments seek to obtain every competitive advantage possible from their e-business infrastructure.

One of the significant problems facing e-businesses is how to prioritize traffic effectively. Consider, for example, an office supply company that offers its customers many different items from its Web site. For simplicity, suppose that the company's products can be grouped according to their selling price, as follows:

1. Inexpensive items. In this example, this group consists mainly of items that sell for $5.00 or less, such as paper clips, pencils and pens, notebook paper, and so forth.

2. Moderately-priced items. This group consists of items that sell for more than $5.00, but not more than $100.00. Examples might include boxes of paper, hand-held calculators, and small office furniture.

3. Expensive items. This group consists of items than sell for more than $100.00, such as hand-held computers, desktop computers, or large office furniture.

If messages conveying a client's request to purchase a box of paper clips receive the same network priority as a client's request to purchase several desktop computers and items of office furniture, then the e-business is not using its infrastructure in the most productive manner. Other types of businesses may also offer products or services spanning a wide price range, and this inefficient use of resources will be encountered by those businesses as well.

Accordingly, what is needed are techniques for providing differentiated priority for network traffic, in an application-specific manner.

SUMMARY OF THE INVENTION

An object of the present invention is to define techniques for providing differentiated priority for network traffic, in an application-specific manner.

Another object of the present invention is to provide techniques for allowing application programs to influence priorities among their own traffic.

Yet another object of the present invention is to provide techniques whereby application programs supply input for determining traffic priority, where network policy can be consulted to balance resource allocation among competing applications.

A further object of the present invention is to provide techniques for supporting application-specific prioritization without exposing sensitive information in the public network.

Still another object of the present invention is to provide application-specific prioritization in a flexible manner, whereby applications not adapted for this purpose can seamlessly co-exist with applications that have been so adapted, and such that newly-adapted applications can be dynamically accommodated.

An additional object of the present invention is to provide application-specific prioritization in a manner that is transparent to client software and to end users.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for providing application-specific prioritization in a networking environment. In one embodiment, this technique comprises determining, by an application, priority information for outbound messages of the application; annotating the outbound messages with the determined priority information; and transmitting the annotated outbound messages from the application, wherein the annotations enable devices in a network path of each transmitted message to prioritize delivery of the message to a recipient.

The priority information is preferably relative prioritization, indicating how individual ones of the outbound messages should be prioritized as contrasted to other ones of the outbound messages, and the annotations preferably comprise a cookie in a header of each outbound message.

The technique may further comprise receiving, by the application, previously-determined priority information on inbound massages, wherein the determination of priority information uses the previously-determined priority information as an input.

In another aspect, this technique comprises: receiving priority information generated by an application for its outbound messages; classifying the outbound messages, using the received priority information; and forwarding the outbound messages to the intended recipients using one or more priority values indicated by the classification thereof The priority information is preferably relative prioritization, indicating how individual ones of the outbound messages should be prioritized as contrasted to other ones of the outbound messages, and the priority information for a particular outbound message is preferably received in a cookie associated with the particular outbound message. Classifying the outbound messages preferably further comprises comparing the received priority information to prioritization policy (which may be stored as rules).

The forwarded messages preferably include the classification, and the forwarded classification on a particular forwarded message is preferably automatically returned by a recipient of the particular forwarded message on subsequent messages which are related to the particular forwarded message. In this case, the technique preferably further comprises: receiving one or more subsequent messages which are related to the particular forwarded message, including the forwarded classification; and passing each of the subsequent messages and its classification to the application. The classification may be used to determine a priority of the subsequent message, and this priority is then preferably used when passing each of the subsequent messages and its classification to the application.

The classification is preferably encoded in the forwarded message, or may be encrypted in the forwarded message.

The present invention will now be described with reference to the following drawings, in which like reference numbers denote the same element throughout.

DESCRIPTION OF PREFERRED EMBODIMENTS

The present invention defines novel techniques that enable an application to prioritize its traffic in an application-specific manner, such that traffic which is most important to this application can be prioritized over traffic that is less important to this application, where this prioritization information is reflected in differential treatment of the traffic within the network. In general, the application may provide any type of function, although (for purposes of illustration but not of limitation) preferred embodiments are described herein as Web-based e-business applications that use HTTP request and response message exchanges.

The disclosed techniques consider the application as the "sole provider" of information about the specific nature of application data, and allow each application to specify relative priority that should be used among request and response messages for this application's own traffic. A site-wide perspective is provided by a Web proxy, referred to equivalently herein as an "edge server", which balances priority among multiple applications. In preferred embodiments, the edge server consults policy information which is preferably stored as rules having conditions and actions, and these rules are preferably specified by a systems administrator to ensure that a proper site-wide balance is achieved, allowing applications to have differentiated access to resources (such as bandwidth and transmission priority).

Figure 1:
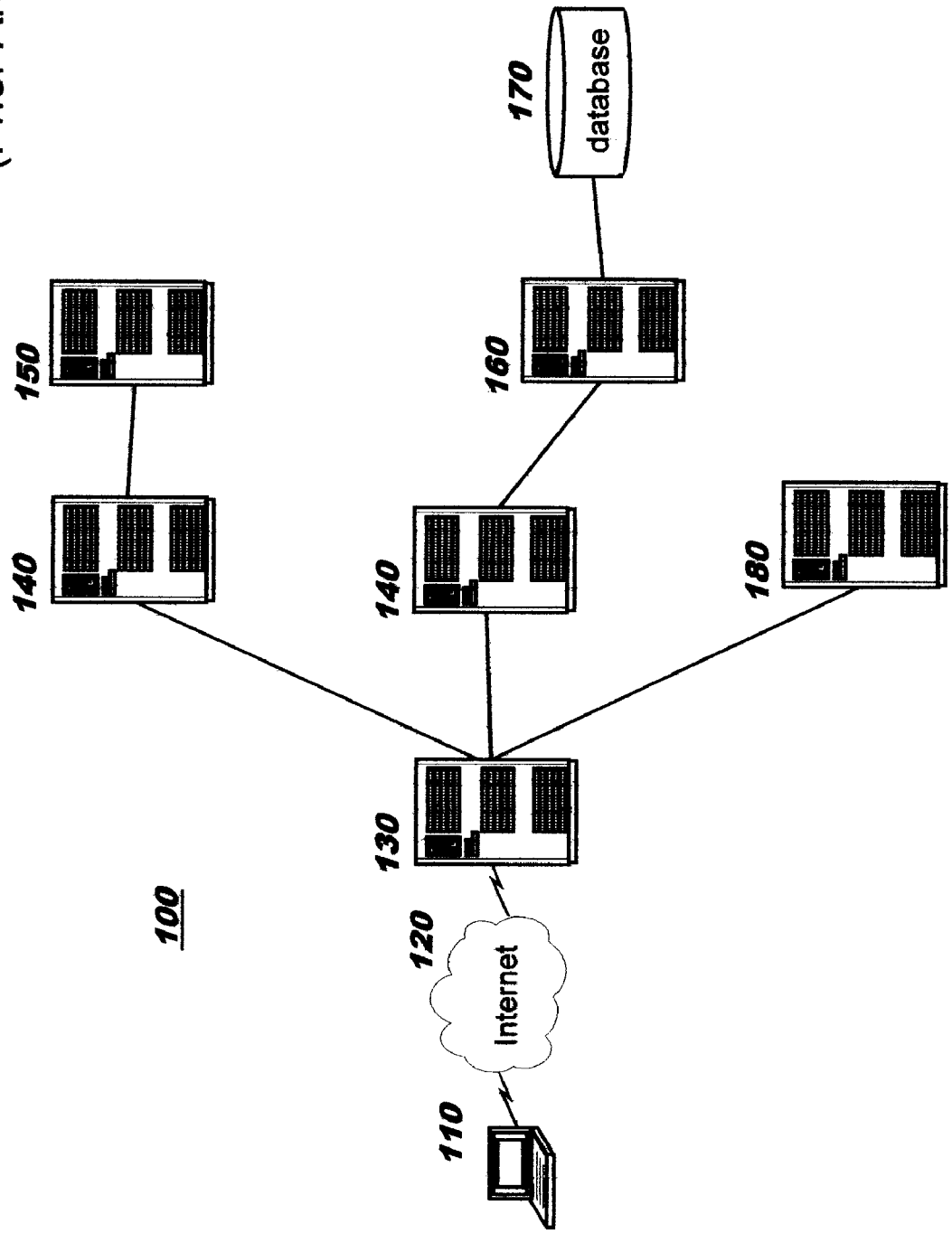
FIG. 1 is a diagram of a server site in which client requests are processed, according to the prior art.

A typical placement of edge servers and application servers is illustrated in FIG. 1, which provides a diagram of a representative server site 100 site in which client requests are processed. The term "server site" as used herein refers to a collection of server nodes that serve Web content associated with a given fully-qualified domain name. For example, the server site 100 in FIG. 1 may (for purposes of example) serve content for a domain name such as "www.ibm.com". In this example, a client 110 transmits a request through a network such as the Internet 120, where this request is received by a Web proxy 130. The Web proxy may also perform a load balancing function, in which case it may select one of the Web servers 140 (such as Apache, Netscape, or Microsoft servers), according to the load balancing strategy which it implements. To process the client's request, a particular Web server 140 may invoke the services of an application server 150 (such as an IBM WebSphere® application server). In some cases, the application server and Web server are co-located in a single hardware box, as shown at 180. The Web server may also or alternatively invoke the services of a back-end enterprise data server 160 (such as IBM OS/390® servers running the DB/2, CICS®R, and/or MQI products from IBM), which may in turn access one or more databases 170 or other data repositories. ("WebSphere", "OS/390", and "CICS" are registered trademarks of IBM.)

The Web proxy 130 may also function as a load balancing host and/or cache server. The IBM WebSphere Edge Server is one implementation which provides this combined functionality. For example, it may be possible in some cases to serve the requested content from cache which is accessible to host 130, rather than sending the content request on to a Web server 140.

The components shown in FIG. 1 are known in the art. Edge server 130 and one or more application servers 150, 180 or back-end servers 160 may be augmented with embodiments of the present invention to provide more efficient infrastructure use and to provide differentiated service that reflects a client transaction's application-specific value. It should be noted that "value" to an application is described herein with reference to monetary value such as the selling cost of items offered for sale by an e-business. This is for purposes of illustration; it may be useful in a particular implementation to prioritize traffic using additional or different criteria.

For some applications, the value of messages within the supported client transactions may be static. (The term "transaction", as used herein, refers to exchanges of a plurality of related request and response messages. A transaction may correspond generally to a client session.) For example, an application might provide account maintenance transactions, customer service transactions, and order inquiry transactions, where all the messages for a particular transaction may be considered in that implementation as having an identical value. On the other hand, the value of messages within a transaction may vary, and the techniques disclosed herein also allow applications to dynamically alter the priority of messages within an individual transaction.

Suppose, for example, that a customer of the on-line office supply company spends some time browsing the on-line catalog, reading about special offers or company policies, and then decides to order some items. Assuming that the messages for these various activities comprise a single transaction, the disclosed techniques allow the messages pertaining to the customer's order to be programmatically assigned a higher priority than the other messages in this customer's transaction. In addition, the value of this customer's order can be used to programmatically assign the messages that transmit the order a higher priority than the messages of other customers who are ordering lesser-valued items (or who are performing lesser-valued activities). So, for example, a customer who is ordering expensive office furniture will typically experience better response time than the customer who orders paper clips (and the customer ordering the paper clips might experience better response time than a customer who is merely browsing the catalog, depending on how the application chooses to prioritize its traffic). Many other scenarios for differentiated traffic prioritization may be envisaged, once the teachings disclosed herein are known.

A key advantage of the disclosed techniques is that applications do not need knowledge of the overall network conditions, or of the site-specific rules that control priority among multiple applications: this is the responsibility of the Web proxy. In addition, the Web proxy does not need to know details of each application's data and which data is more important to that application: this is the responsibility of the individual application (or applications, in a site hosting more than one application).

Another advantage of the disclosed techniques is that preferred embodiments provide a flexible implementation whereby some applications may be adapted for providing application-specific prioritization information to an edge server, whereas other applications not similarly adapted continue to function and to interoperate with this same edge server in a seamless manner.

Figure 2:
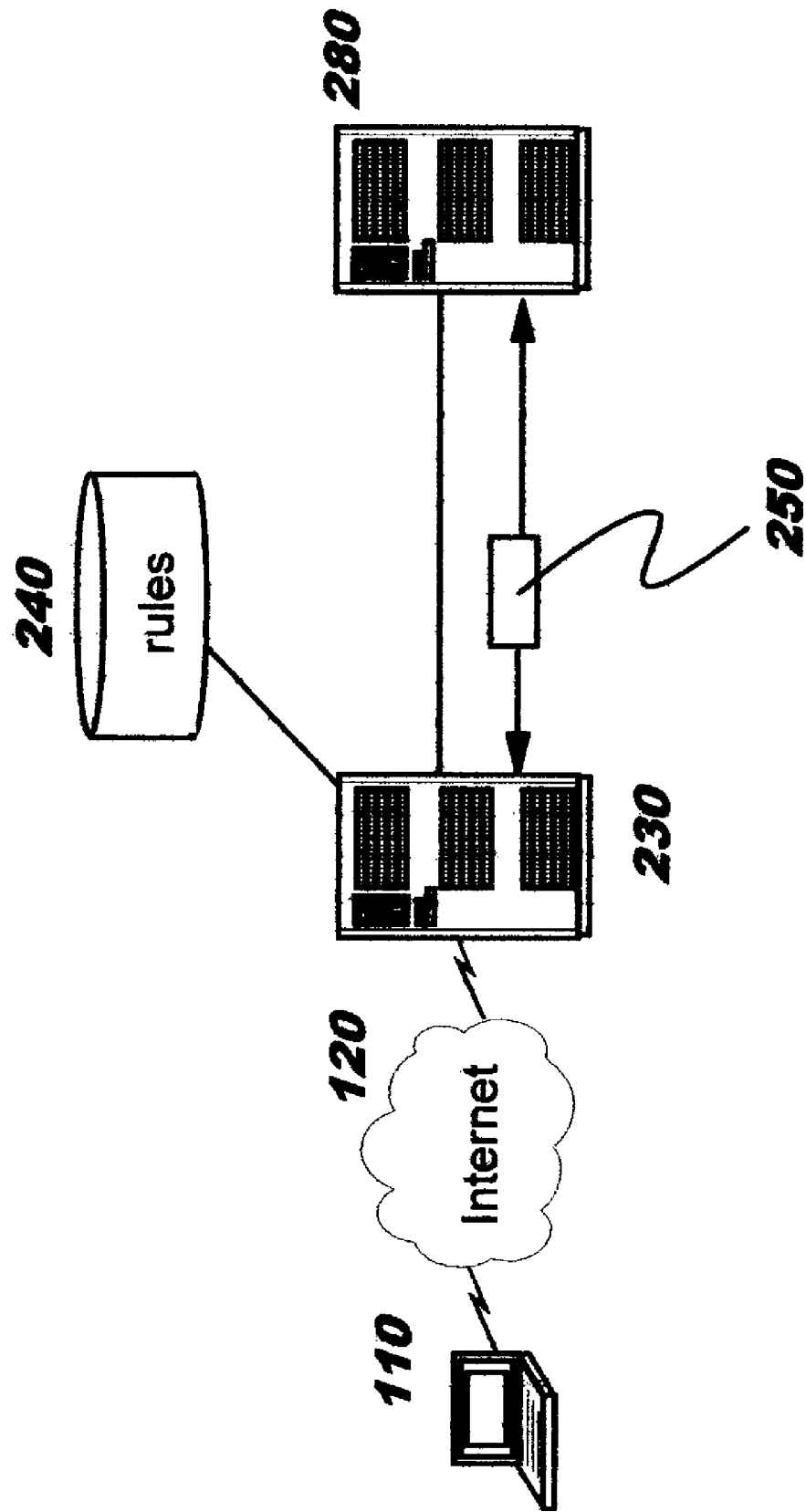
FIG. 2 provides a diagram showing interactions among components that provide input to the traffic prioritization technique used by preferred embodiments of the present invention.

The diagram in FIG. 2 shows a high-level view of interactions among components that provide input to the traffic prioritization technique used by preferred embodiments of the present invention. A Web proxy or edge server 230, augmented according to the present invention, receives HTTP requests (or requests in a similar protocol) from client software 110, such as a client Web browser. Note that the client implementations are unchanged, and according to preferred embodiments, have no awareness that their traffic may be prioritized using the techniques disclosed herein. The edge server 230 may perform a number of functions which are known in the art, as discussed above, such as caching frequently-used Web pages in memory to reduce network traffic and reduce response time to users. Using techniques of the present invention, the edge server 230 can selectively prioritize outbound traffic destined for a particular client 110, and may also selectively prioritize its own internal processing, including how it forwards request messages to application servers 280.

To overcome the inherent limitations in the stateless protocols used to transmit Web traffic (e.g., HTTP or "HTTPS", which is a security-enhanced version of HTTP), data objects known as "cookies" have been defined. A "cookie" is a data object transported in variable-length fields within HTTP request and response headers, as a means of maintaining application state information across a plurality of messages.

Cookies are well known in the art, and both edge servers and cookie-enabled applications are present in most large server sites that host Web traffic. The present invention provides for improved cooperation between these two technologies, such that network traffic can more efficiently utilize system resources. In addition, response time to end users can be optimized, leading to improved user satisfaction and less likelihood that e-business will be lost to the competition.

Preferred embodiments of the present invention use a cookie which will be referred to herein as an "application-specific classification cookie", or "ApplClass cookie". This cookie transmits information between the edge server 230 and an application executing on an application server 280, as shown at element 250 of FIG. 2. The application sends information to the edge server using the ApplClass cookie, for use in the traffic prioritization process. The edge server uses this information, in conjunction with rules (or analogous policy information) from a repository 240, to carry out the prioritization policy embodied in the rules.

Use of the ApplClass cookie allows both the edge server and the application to reduce the overhead associated with traffic prioritization. After initially setting classification input values (i.e., values that will be used by the edge server when determining a message's priority) for a particular transaction, an application can be "reminded" of its previous settings by inspecting the ApplClass cookie returned by the edge server with subsequent request messages for this transaction. The edge server, similarly, can quickly determine whether the priority of an outbound message received from the application needs to be recomputed, by comparing the ApplClass cookie included in the header for that outbound message to the previous version of the ApplClass cookie (which is stored in the QoS cookie described below, according to preferred embodiments) to see if the application has changed the classification input values contained therein. Additional optimizations may be made as well, such as grouping the rules within the rules repository so that a particular edge server needs only to consider the rules affecting applications which it serves, and (optionally) caching that rules set for faster processing.

Figure 3:
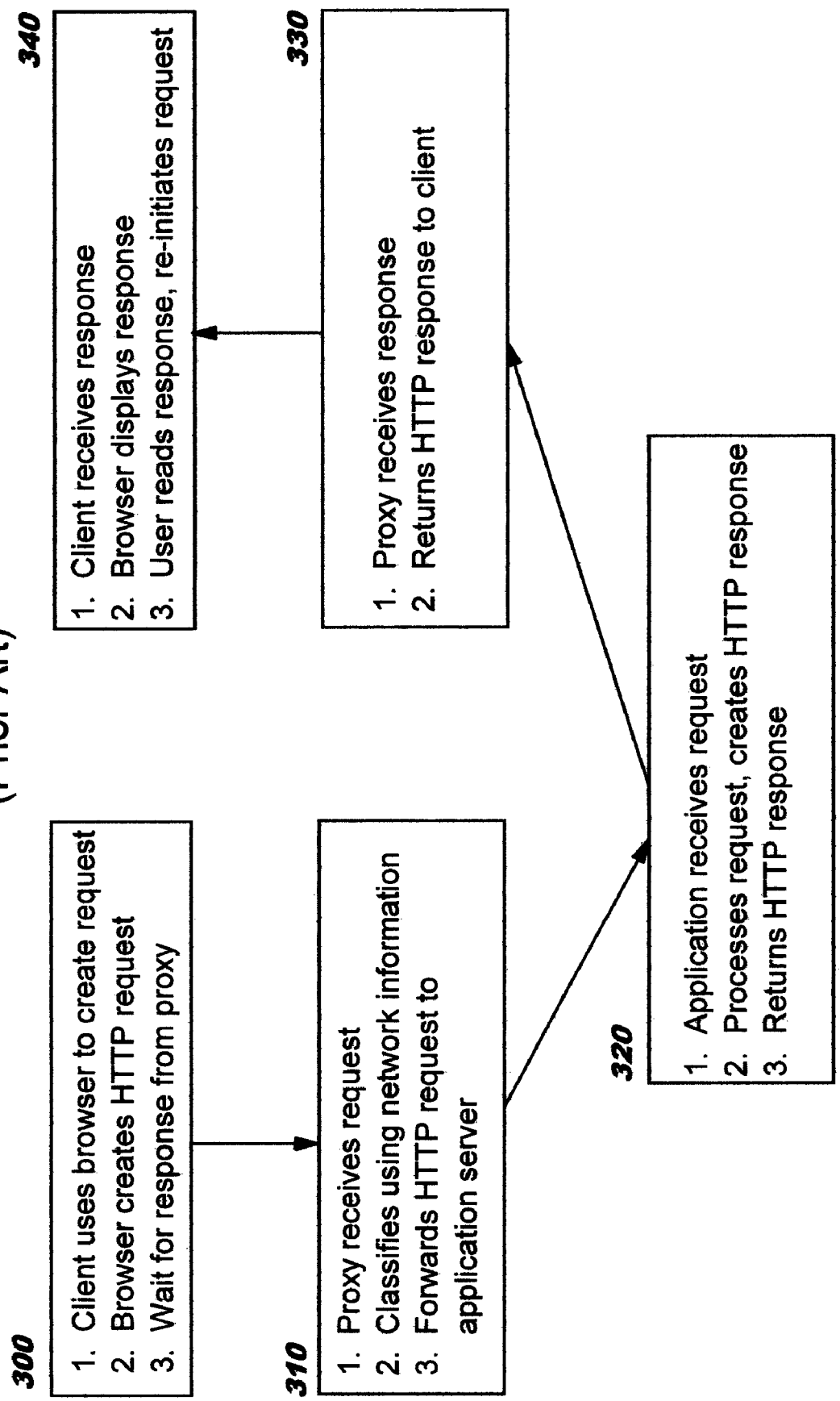
FIG. 3 illustrates the flow of requests and responses between a client, proxy, and application server in the prior art.

Consider the flow of requests and responses between a client, proxy, and application server in the prior art, as shown in FIG. 3. Responsive to an end user interacting with client software such as a browser, a request is created and formatted with an HTTP request header. (See element 300.) This request is sent by the browser, and eventually reaches the proxy. Meanwhile, the client browser awaits a response to its request. The HTTP request may contain one or more cookies of the prior art, which are sent in HTTP headers as discussed earlier.

When the proxy receives the client's request, it may classify the request using prior art techniques, where this classification may then be used for a type of prioritization available in the prior art. (See element 310.) In particular, prior art prioritization uses general network information such as an identifier of the requesting user and/or user agent, the target address or Uniform Resource Locator ("URL") of the request, the source and/or destination Internet Protocol ("IP") address/port, and so forth. However, the proxy has no knowledge of the request's value to the target application: because it knows nothing about the data conveyed in the request message, the proxy cannot determine, for example, whether a message transmitting an order for one box of paper clips should be prioritized over a message transmitting an order for two desktop computers.

After classifying and possibly prioritizing (i.e., relative to other traffic being processed by this proxy) the client request, the proxy forwards the HTTP request to the application server. The application processes the request, and creates a response message that is then returned to the proxy as an HTTP response message. (See element 320.)

The proxy receives this response message, and forwards it to the client. (See element 330.) Upon receiving the response, the client browser displays or otherwise renders the message, and the end user may read this message and perhaps initiates a subsequent message. (See element 340.)

Note that in this prior art scenario, the application server and proxy are processing requests and responses independently. That is, while the proxy may be performing a type of prioritization, it has no information from the application to use in this process that enables prioritizing the application's traffic as disclosed herein. Although cookies may be transmitted throughout the network path, they do not provide the cooperative processing disclosed herein. In fact, passing classification information of the type disclosed herein within this prior art scenario would expose the infrastructure to serious security problems, as will be discussed in more detail with reference to FIG. 4.

Figure 4:
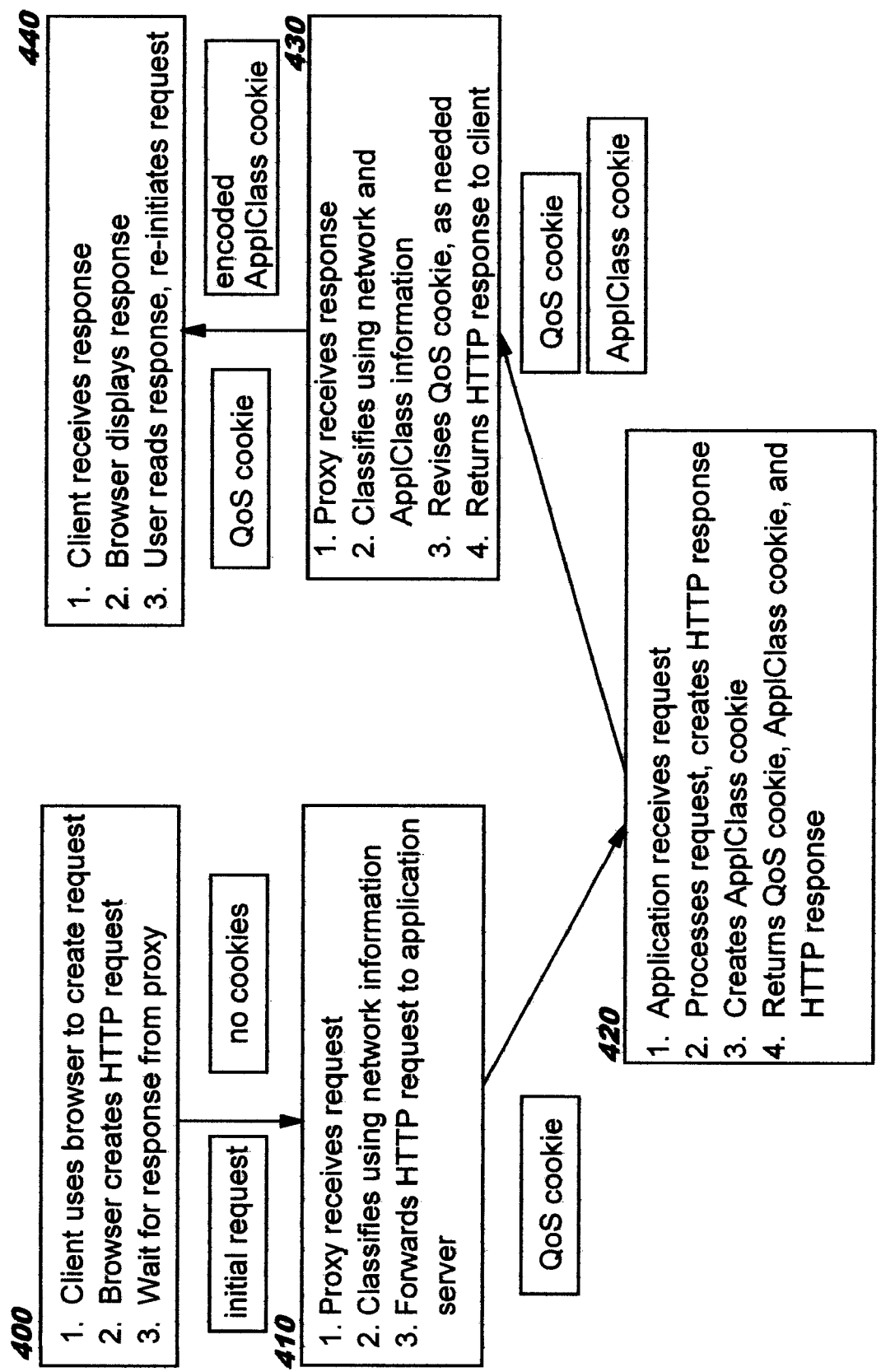
FIGS. 4 and 5 illustrate the flow of requests and responses between a client, proxy, and application server for an initial client request and for subsequent client requests, respectively, according to preferred embodiments of the present invention.

FIG. 4 illustrates the flow of requests and responses between a client, proxy, and application server for an initial client request, according to preferred embodiments of the present invention. The client is a prior art client implementation (that is, an implementation which is not specifically adapted for use with the present invention), as stated earlier, and thus the processing performed on the client as this initial request is created and sent to the proxy is identical to that which has been described above for FIG. 3. (See element 400.)

When this initial request is sent from the client to the proxy, neither a QoS cookie or an ApplClass cookie is present. The proxy, augmented according to the present invention, receives this initial request and may classify and prioritize the request using general network information, as discussed above. (See element 410.) Now, however, preferred embodiments embed the classification information into a QoS cookie. The client's request is then forwarded to the application server, along with the QoS cookie.

The application receives this forwarded request, along with the QoS cookie, and processes the request. (See element 420.) If the application is adapted to use techniques of the present invention, then the application may provide classification input values to be used in the proxy's traffic prioritization decision, where these classification input values reflect application-specific transaction state and perhaps other application-specific considerations. According to preferred embodiments, these values are stored in an ApplClass cookie, and this ApplClass cookie is embedded within the QoS cookie. (Examples of the ApplClass cookie and QoS cookie are discussed below, with reference to FIGS. 6 and 7.)

If it is not adapted to use techniques of the present invention, then the application does not create an ApplClass cookie, and the QoS cookie is not altered by embedding an ApplClass cookie within it.

In either case, the application then returns its response to the proxy.

The proxy can determine whether or not the application is adapted for using techniques of the present invention based upon whether it receives an ApplClass cookie from the application, and can easily alter its processing as appropriate. (See the description of Block 905 of FIG. 9, below.) Accordingly, there is no requirement that all applications using a particular proxy must be updated (or not updated) to use techniques of the present invention; instead, a mixed environment can be supported. A phased implementation approach may be used, if desired, where (for example) only the applications that are thought to benefit most from application-specific traffic prioritization are changed initially. This allows an e-business to differentiate service of its most critical applications at one point in time, and to later re-evaluate other applications to determine whether they should be adapted for differentiated service. Adaptation of applications can be on-going, as criteria change, or it may be performed periodically. In addition, the change required for each application is relatively simple and is generally uniform from one application to another (with the exception of determining how the application's priorities should be reflected in the classification input values), so that the change may be propagated efficiently, productively, and pro-actively among a group of applications.

Returning to the discussion of FIG. 4, upon receiving the application's response, the proxy retrieves the embedded ApplClass cookie from the QoS cookie. (See element 430.) The classification input values from the ApplClass cookie, and perhaps network information as well, can then be used to more accurately classify this message for prioritization. After consulting any applicable rules, the prioritization of this message may need to be redefined. If so, then the prioritization information stored in the QoS cookie is revised. (Note that it may happen that the proxy funds no matching rules for a particular set of values. In this case, default prioritization values are preferably used.)

Before forwarding the response to the client, in preferred embodiments the proxy embeds the ApplClass cookie into the QoS cookie, which is then encoded. The response and the encoded QoS cookie are then sent to the client.

Preferred embodiments encode the QoS cookie before transmitting it from the proxy to the client or from the proxy to the application server. Preferably, the format of this cookie is not published, so that only the proxy and the intended application can decode and process the information from the cookie. (In some cases, an application might choose not to process the encoded cookie or portions thereof.) In alternative embodiments, stronger security may be provided by using shared key or public key cryptography to encrypt the cookie (or portions thereof). In these alternative embodiments, the ApplClass cookie may be copied into the QoS cookie, and the encryption can be performed on this QoS cookie; or, the ApplClass cookie values may be encrypted prior to copying them into the QoS cookie.

The classification value of a particular message is considered to be sensitive information, and thus preferred embodiments use encoding so that they do not expose the application-provided classification input information in the clear within the public network (i.e., on the outbound side of the edge server). This is in contrast to the prior art scenario depicted in FIG. 3, where prior art cookies flow between the client and edge server without being encoded. By not allowing the client browser or end user to see the classification information provided by the application, a malicious client will be prevented from creating a spoofing attack or performing other types of intrusions or performance attacks; having no information about what is done to give differentiated service, the malevolent client will be unable to create cookies that would enable its request messages to have priority treatment (or to receive services that were not authorized by the systems administrator). Encoding the classification information also prevents competitors of the e-business from learning how it prioritizes its traffic.

When the client receives the application's response, it is processed in the same manner discussed above with reference to FIG. 3. (See element 440.) In this case, however, the QoS cookie is present, and according to conventional cookie processing, will be stored on the client device.

Figure 5:
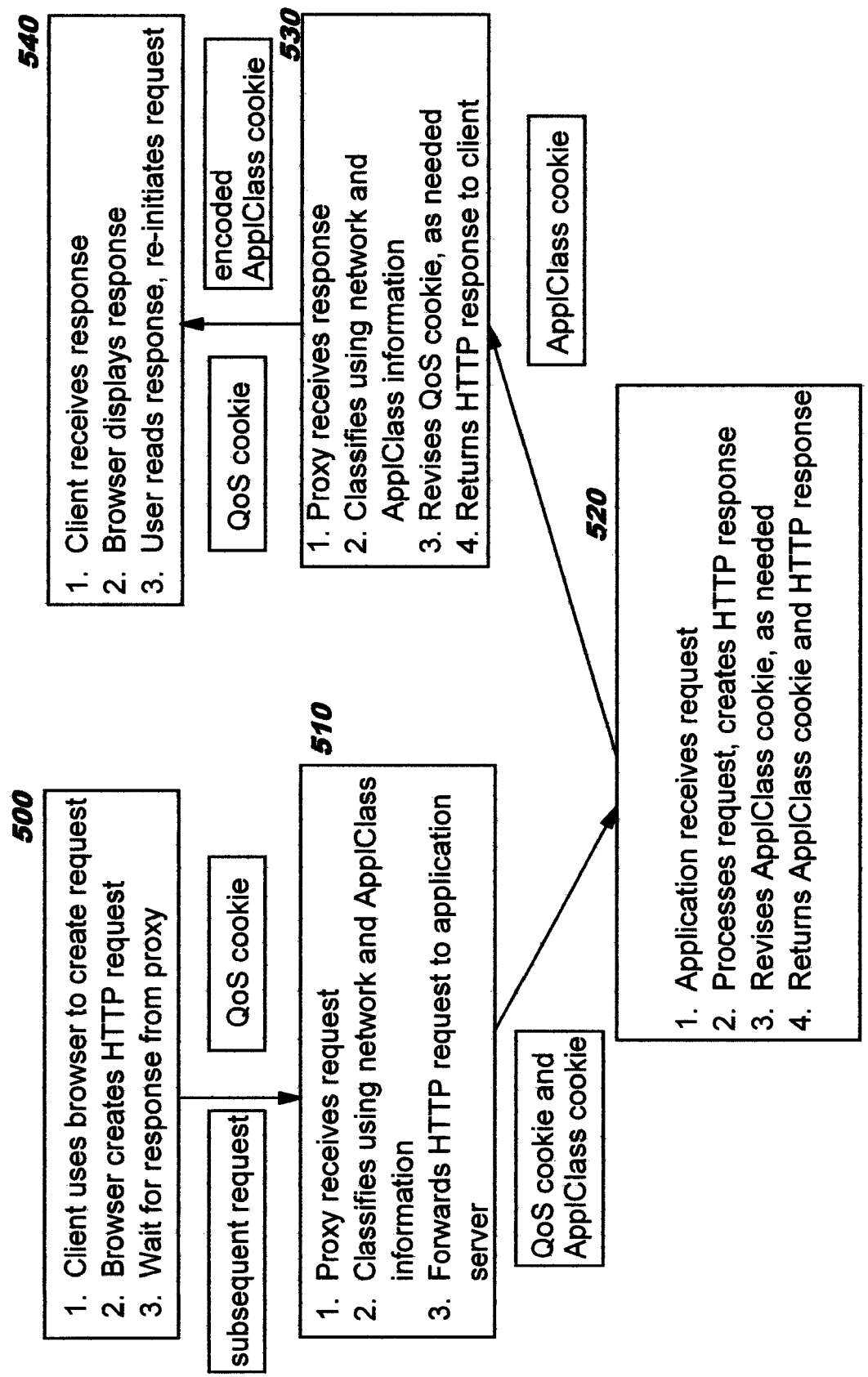

FIG. 5 illustrates the flow of subsequent client requests—that is, client requests that continue the processing of FIG. 4—according to preferred embodiments of the present invention. Again, the client uses a browser or other software to create a request, and to send this request to the proxy. (See element 500.) Because the client received a QoS cookie with the initial response message in FIG. 4, it automatically includes this QoS cookie when sending subsequent request messages.

When the proxy receives the subsequent client request, it may need to revise the prioritization information based on changed network information. (See element 510.) The prioritization might also be revised because of the application-created classification input information, which the proxy retrieves by decoding (or decrypting, in alternative embodiments) the ApplClass cookie within the QoS cookie that was received from the client. Preferably, the QoS cookie is rewritten, so that the decoded ApplClass information is now exposed. If the prioritization information is changed, then this information within the QoS cookie is also rewritten.

The proxy then forwards the client request, which now includes both a QoS cookie and an ApplClass cookie, to the application. The application processes this request, and again may consider application-specific information to determine whether modified classification input values should be sent to the proxy. (See element 520.) Having the ApplClass cookie, as returned to it by the proxy, enables the application to quickly determine what classification input values it previously specified for this client's on-going transaction. A decision can then be quickly made as to whether the current state of the transaction warrants changing the message priority. In this manner, processing overhead at the application is minimized.

After revising the classification input values, or determining that no change is required, the application then returns the ApplClass cookie, along with its response to the client's subsequent request, to the proxy. Note that while in preferred embodiments the entire QoS cookie is returned from the application to the proxy, the application does not change values in that cookie (beyond the classification input values of the ApplClass cookie that would be embedded therein), and thus it is not strictly necessary for the application to return the entire QoS cookie to the proxy, and an alternative embodiment may be adapted to only return the ApplClass cookie. In this alternative embodiment, the proxy can use its own stored version of the QoS cookie, along with the returned ApplClass cookie. Alternatively, the application can return the entire QoS cookie if desired.

When the proxy receives the application's response for the subsequent client request, it is preferably processed in the same manner that has been described with reference to FIG. 4, and the prioritized response message and its QoS cookie (and embedded ApplClass cookie) are returned to the client. (See element 530.) The client may then review the response and issue further requests. (See element 540.) The scenario depicted in FIG. 5 then repeats, as necessary.

By transmitting information between the proxy and application using cookies, as has been described with reference to FIGS. 4 and 5, the techniques of the present invention incorporate information that is known by the application, and only by the application, into the traffic prioritization decision carried out by the proxy.

Figure 6:
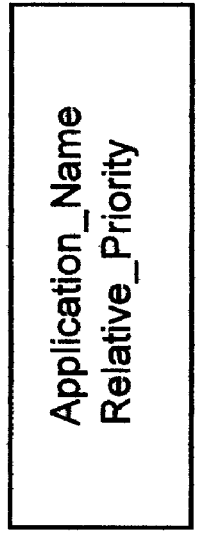
FIG. 6 illustrates an application-specific classification ("ApplClass") cookie, according to preferred embodiments of the present invention.
Figure 7:
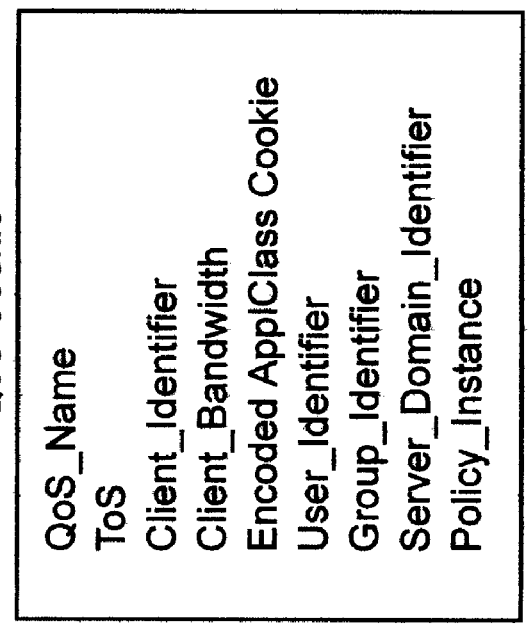
FIG. 7 depicts the format of a quality of service ("QoS") cookie, according to preferred embodiments of the present invention.

Referring now to FIGS. 6 and 7, sample cookie formats for the ApplClass cookie and QoS cookie are shown. The classification input information specified in the ApplClass cookie (FIG. 6) is shown in the example as (1) an application name and (2) a relative priority value used to weight traffic within this application. Using the office supply scenario again, the priority value might be a digit, character, or keyword that indicates which of the three selling price categories is represented by a particular message. For example, keywords (or numeric identifiers) might be assigned as follows:

0. "Default": indicating that this message should be classified using network information alone (i.e., without application-specific data), or perhaps indicating that the proxy should use the existing priority values (i.e., the priority values it computed for the most recent message for this client)

1. "Bronze": representing the inexpensive items
2. "Silver": representing the moderately-priced items
3. "Gold": representing the expensive items As has been stated, an application may dynamically change the classification input information it provides to the proxy, in order to request that the proxy apply different prioritization starting with the current message. If the office supply on-line shopping application detects that a user who was previously browsing the catalog is now beginning to order expensive items, for example, the application might change the relative priority value from "Default" to "Gold", allowing this user's messages to receive preferential treatment as compared to this application's other traffic. The application can continually monitor the user's messages, reducing the priority if the user begins sending "less valuable" requests.

The prioritization performed by the proxy may be used to alter the outbound transmission of responses to the client, and may also be used to alter the inbound transmission of requests to the application. In addition, the proxy may use the prioritization information (or the classification input information) to alter other aspects of its internal processing, such as where messages are placed in queues and so forth.

The QoS cookie (FIG. 7) is depicted as having (1) a QoS name, such as Gold, Silver, or Bronze (in the office supply example); (2) a ToS ("Type of Service") value, which may also be referred to as a "Differentiated Services Code Point" or "DSCP" value, indicating the bits that are used in IP packet headers to prioritize traffic; (3) a client identifier, such as a user agent name, client IP address, or other type of identifying information; (4) a client bandwidth value, which represents the available bandwidth for transmitting to this client and which may be a numeric value such as 44,000 or a textual value such as "high" or "low"; (5) an encoded representation of the application name and relative priority which make up the ApplClass cookie; (6) a user identifier, identifying the end user associated with this message; (7) a group identifier, indicating a group to which this user belongs (e.g., allowing user privileges to be quickly ascertained); (8) a server domain identifier, such as "www.ibm.com"; and (9) a policy instance value, which is preferably used to determine whether the policies previously used to prioritize this transaction's messages have changed. (Refer to the discussion of the third related invention, below, for more information about this topic.) These parameters, with the exception of the encoded ApplClass cookie, are provided merely as examples, and a QoS cookie for a particular implementation may contain different and/or additional parameters.

Figure 8:
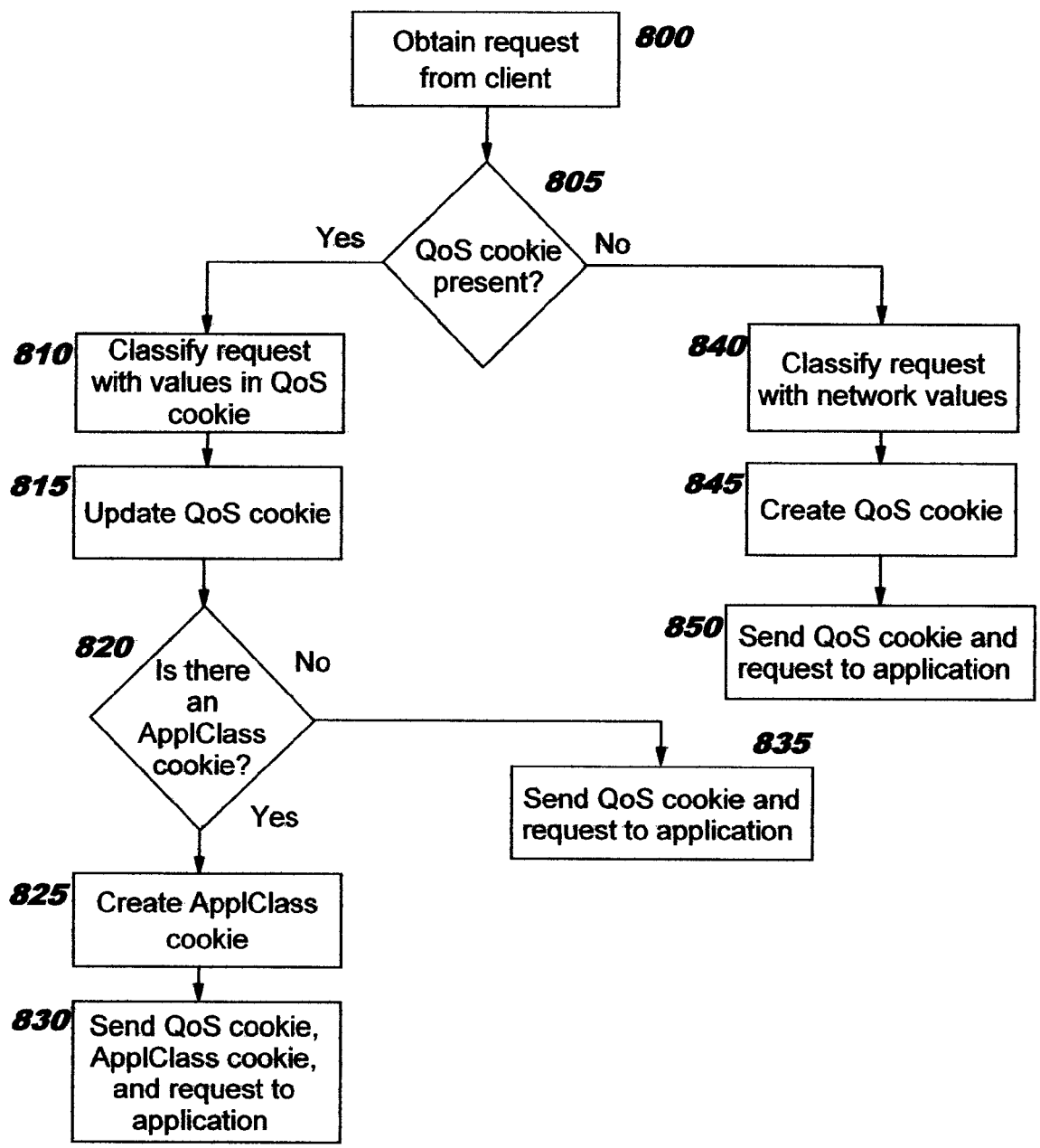
FIG. 8 provides a flowchart depicting logic which may be used for processing inbound client requests, according to preferred embodiments of the present invention.
Figure 9:
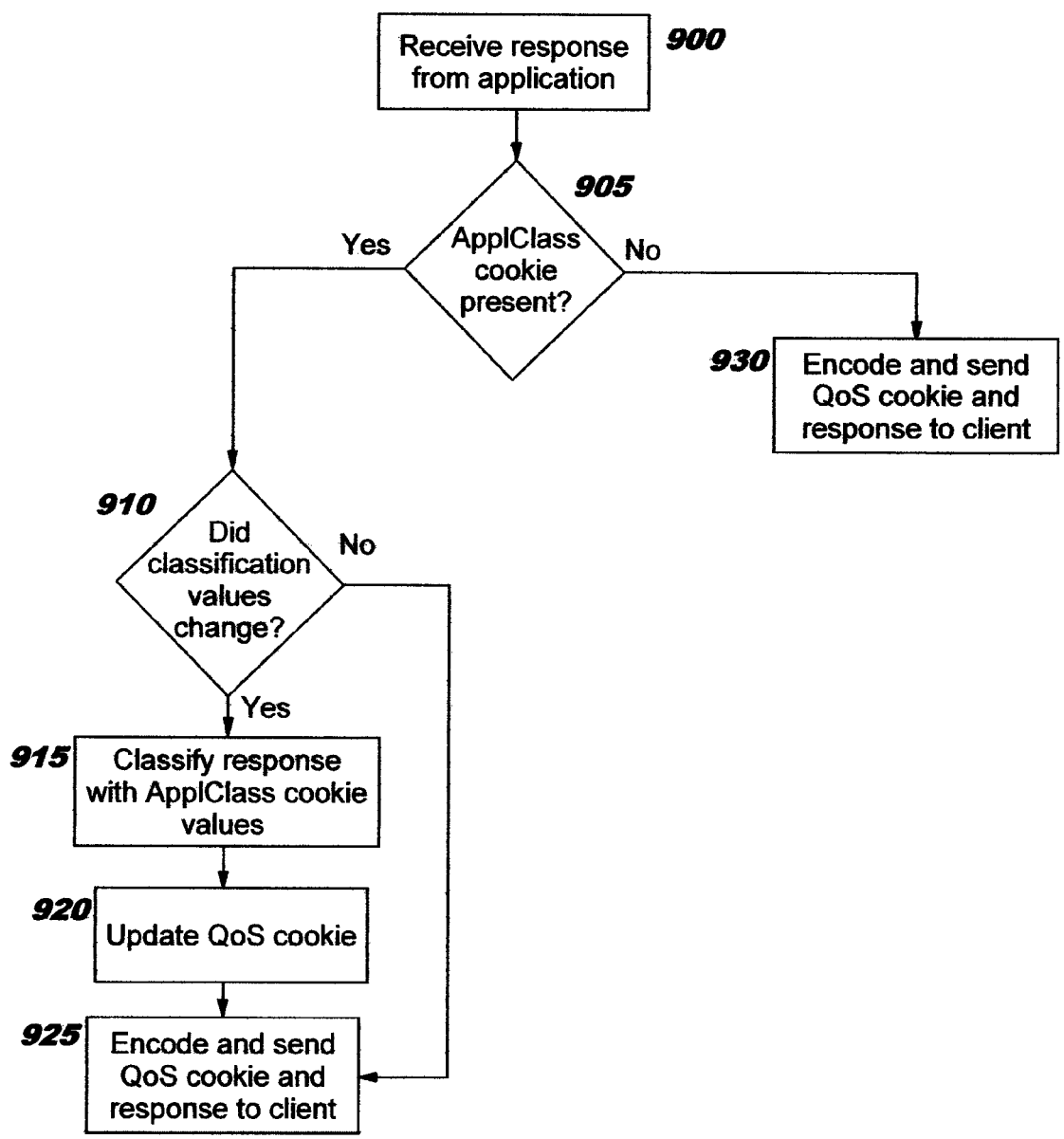
FIG. 9 provides a flowchart depicting logic which may be used for processing outbound application responses, according to preferred embodiments of the present invention.

The flowcharts in FIGS. 8 and 9 depict logic that may be used to implement preferred embodiments of the present invention within an edge server. The logic for processing inbound client requests, shown in FIG. 8, begins at Block 800 where the client's request is received. Block 805 tests to see if a QoS cookie is contained in the headers accompanying this request. If so, then this is a "subsequent" request as illustrated by FIG. 5, and processing continues at Block 810.

Block 810 classifies the inbound request using information from the QoS cookie (see FIG. 7). If this classification indicates that any new values should be used in the QoS cookie, then the cookie is updated (Block 815). This classification of inbound traffic allows different priority values to be applied to outbound traffic (that is, traffic destined for one or more application servers), and may use (for example) current network conditions and various attributes of the inbound traffic, such as its ToS values.

Block 820 then checks to see if the QoS cookie contains an embedded ApplClass cookie. If this test has a positive result, then at Block 825, the edge server creates an ApplClass cookie by decrypting the embedded cookie. This ApplClass cookie and the QoS cookie are forwarded, along with the client's inbound request, to the application (Block 830). The processing of FIG. 8 then ends for this request message.

When the test in Block 820 has a negative result, indicating that there were no ApplClass cookie values embedded in the QoS cookie, then processing transfers to Block 835, which forwards only the QoS cookie and the client's request to the application.

Control reaches Block 840 if the inbound client request did not have a QoS cookie. Typically, this occurs when the client is submitting its initial request (corresponding to the flow in FIG. 4). This may also happen if the client does not support cookies. For those clients not supporting cookies, the "cookie jar" technique described in the first related invention may be used. This cookie jar technique uses URL rewriting to enable cookies for client messages to be stored within the server side of the network; when a subsequent client request is received, its rewritten URL identifies where the cookie is stored. The cookie is then retrieved from that location, and passed among server-side components while processing the request and its response. Before sending the response to the client, the cookie is extracted, stored back in the cookie jar, and URLs in the outbound message are rewritten to enable locating the cookie for subsequent messages. Refer to this related invention, which is incorporated herein by reference, for a detailed description of cookie jar processing. (If cookie jar processing is supported by an implementation of the present invention, then the path on the left side of FIG. 8, comprising Blocks 810-835, will be followed if a QoS cookie is found in the cookie jar.)

Having not found a QoS cookie, Block 840 proceeds to classify the request using general network information. Block 845 then creates a QoS cookie for this transaction, and inserts the values resulting from Block 840. The QoS cookie and inbound request are then forwarded to the application (Block 850), after which the processing of FIG. 8 is complete for this request.

The logic for processing outbound application responses, shown in FIG. 9, begins at Block 900 where the application's response is received by the edge server. Block 905 tests to see if the application has included an ApplClass cookie in this response. If so, then processing continues at Block 910, which checks to see if the classification input values in the ApplClass cookie are different from those represented by the QoS cookie. If the values have not changed, then preferred embodiments do not recompute the priority of this message, and thus control transfers to Block 925. In this manner, the processing overhead at the edge server is reduced. (Alternatively, an implementation of the present invention may choose to always re-evaluate the classification input values, without deviating from the scope of the present invention.)

When the application has provided new classification input values, then processing reaches Block 915, where the response message will be classified and re-prioritized. (Network information may also be used in this process, if desired. For example, the edge server may consider Transmission Control Protocol, or "TCP", min/max rates using prior art techniques, and alter its prioritization decision accordingly.) Block 920 updates the QoS cookie to reflect the newly-determined prioritization, and rewrites the embedded ApplClass cookie as well. In Block 925, the QoS cookie and its embedded ApplClass cookie are encoded and then sent to the client, in headers on the response message. (In preferred embodiments, the priority for delivering the response message reflects the edge server's prioritization decision.) Processing of this response message by the edge server is then complete.

When the application's response did not include a QoS cookie, then this is an application that has not been adapted for the techniques of the present invention. (Alternatively, some type of error may have occurred which resulted in losing the QoS cookie; suitable error handling techniques will be obvious to one of skill in the art.) In this case, control reaches Block 930, where the application's response is transmitted to the client, along with the edge server's encoded QoS cookie.

As has been described, the techniques disclosed herein allow a clean separation of information, whereby an application uses application-specific criteria to determine a relative prioritization for its traffic and conveys this as classification input data to the edge server; the edge server then applies policy to carry out the system administrator's decisions. The application is not required to have knowledge of the network, or to include complicated policy-processing logic; the edge server is not required to have knowledge about what an application is doing, or what state the application's transactions are in. In preferred embodiments, overhead attributable to the present invention is minimized within the application and within the edge server. Sensitive classification information is not exposed outside the network path between the application and edge server (and optionally, encryption may be used for sending the ApplClass cookie between these components, if desired; encryption may also be used between the edge server and client).

As an alternative to using rules for expressing policy, a simplified computation may be substituted in the edge server without deviating from the teachings of the present invention. An example of such a simplified algorithm is to use a lookup table in which prioritization information has been specified for pairs of (application name, relative priority) values.

Site-wide policy values are preferably used, where the systems administrator provides rules (or similar specifications) to differentiate between the traffic of multiple applications, in order to tune the functioning of the site and optimize its resource utilization.

Whereas the second related invention discloses techniques that enable applying consistent QoS requirements for delivery of all the related Web objects comprising a transaction, the techniques used by the present invention are different. The second related invention discloses specifying an available bandwidth for transmitting messages to a client and a relative priority for related messages within a transactional quality of service ("TQoS") cookie. In the present invention, on the other hand, an application provides input for classifying its traffic using a separate cookie, and the edge server makes the decision about the resulting prioritization values (using, as described, the specified policy).

The third related invention discloses techniques for efficiently classifying packets using stored policy. A hash value is computed over a set of rules specifying policy information. The hash value is transmitted in a cookie. When a message arrives at an edge server, the hash value stored in the message's cookie is compared to a hash value of the current policy, thereby quickly determining whether the policy used previously for this transaction's messages is still valid. (If so, then it may be possible to reuse the previously-determined classification.) The efficient classification techniques of this third related invention may optionally be used with an implementation of the present invention.

Note that reference herein to use of HTTP messages is for purposes of illustration and not of limitation. Other similar protocols may be used alternatively, including but not limited to the Secure HyperText Transfer Protocol ("HTTPS").

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A system for providing message prioritization in a networking environment, comprising:
    a computer comprising a processor; and
    instructions which execute on the computer, using the processor, to implement functions comprising:
    receiving, at a network device from each of a plurality of application programs, a plurality of outbound messages for forwarding to intended recipients thereof, wherein a message header of each of the outbound messages received from at least two of the application programs specifies message-specific classification input information generated by the application program to influence message-specific prioritization of the plurality of outbound messages generated by that application program and wherein the message-specific classification input information in the message header differs among at least two of the outbound messages received from at least one of the application programs;
    classifying the plurality of received outbound messages, by the network device, using prioritization policy information accessible to the network device and, for the received outbound messages specifying the classification input information in their message header, the classification input information, to assign per-message priority information that balances message handling priority among the plurality of received outbound messages received from the plurality of application programs;
    storing the assigned per-message priority information in the message header of each of the received outbound messages and, for each of the received outbound messages specifying the classification input information, replacing the classification input information from the message header with an encrypted version thereof, such that the encrypted version will automatically be returned to the network device in a related subsequent inbound message, if any, from the intended recipient and can thereby be decrypted by the network device when classifying the related subsequent inbound message; and
    forwarding each of the received outbound messages from the network device to the intended recipient thereof in an order that is determined using the assigned per-message priority information.

2. The system according to claim 1, wherein the prioritization policy information comprises one or more policy rules.

3. The system according to claim 1, further comprising instructions which execute on the computer, using the processor, to implement functions comprising:
    receiving, at the network device from at least one of the intended recipients to which one of the forwarded outbound messages was forwarded, the related subsequent inbound message, wherein the related subsequent inbound message stores, in its message header, the encrypted version of the classification input information;

decrypting, by the network device, the encrypted version of the classification input information to yield the classification input information; and passing, by the network device, the subsequently-received related inbound message and the classification input information to the application program that generated the related forwarded outbound message, thereby enabling the application program to use the classification input information when generating the message-specific classification input information for at least one subsequently-generated outbound message that relates to the subsequently-received related inbound message 4. The system according to claim 3, further comprising instructions which execute on the computer, using the processor, to implement functions comprising:

using, by the network device, the classification input information as decrypted to determine a transmission priority of the subsequently-received related inbound message; and using the determined priority during operation of the passing.

5. A computer-readable storage medium storing a computer program for providing prioritization of messages in a networking environment, the computer program comprising computer-readable program codes that, when executed on a computer, causes the computer to perform:

determining, by each of at least two application programs, per-message classification input information for each of a plurality of outbound messages generated by the application program, wherein the per-message classification input information for the outbound messages generated by at least one of the application programs differs among at least two of those outbound messages;

storing, by each of the application programs in a message header of each of the outbound messages generated by the application program, the determined per-message classification input information for the outbound message; and transmitting the outbound messages from the application programs to a network device, wherein the network device is configured to:

use the stored classification input information in combination with prioritization policy information accessible to the network device to assign per-message priority information that balances message handling priority among the plurality of outbound messages generated by the application programs;

store the assigned per-message priority information and an encrypted version of the classification input information in the message header of each of the outbound messages in a particular manner when forwarding the outbound messages to an intended receipt thereof in an order that is determined using the assigned per-message priority information, wherein the particular manner causes the encrypted version to be automatically returned to the network device in a related subsequent inbound message, if any, from the intended recipient that receives the forwarded outbound message; and decrypt the encrypted version of the classification input information to yield the classification input information for use when assigning the per-message priority information to the related subsequent inbound message.

6. A computer-readable storage medium of claim 5, further comprising computer-readable program code for:

receiving, by a selected one of the application programs, previously-determined classification input information for at least one subsequently-arriving inbound message passed to the selected application program by the network device; and wherein the computer-usable program code for determining uses the previously-determined classification input information as an input for determining per-message classification input information for at least one outbound message which is generated by the selected application program responsive to the subsequently-arriving message.

7. A computer-readable storage medium storing a computer program for providing prioritization of messages in a networking environment, the computer program comprising computer-readable program codes that, when executed on a computer, causes the computer to perform:

receiving, at a network device from each of a plurality of application programs, a plurality of outbound messages for forwarding to intended recipients thereof, wherein a message header of each of the outbound messages received from at least two of the application programs specifies message-specific classification input information generated by the application program to influence message-specific prioritization of the plurality of outbound messages generated by that application program and wherein the message-specific classification input information in the message header differs among at least two of the outbound messages received from at least one of the application programs;

classifying the plurality of received outbound messages, by the network device, using prioritization policy information accessible to the network device and, for the received outbound messages specifying the classification input information in their message header, the classification input information, to assign per-message priority information that balances message handling priority among the plurality of received outbound messages received from the plurality of application programs;

storing the assigned per-message priority information in the message header of each of the received outbound messages and, for each of the received outbound messages specifying the classification input information, replacing the classification input information from the message header with an encrypted version thereof, such that the encrypted version will automatically be returned to the network device in a related subsequent inbound message, if any, from the intended recipient and can thereby be decrypted by the network device when classifying the related subsequent inbound message; and forwarding each of the received outbound messages from the network device to the intended recipient thereof in an order that is determined using the assigned per-message priority information.

8. The computer-readable storage medium according to claim 7, wherein the prioritization policy information comprises one or more policy rules.

9. A computer-readable storage medium of claim 7, further comprising computer-readable program code for:

receiving, at the network device from at least one of the intended recipients to which one of the forwarded outbound messages was forwarded, the related subsequent inbound message, wherein the related subsequent inbound message stores, in its message header, the encrypted version of the classification input information;

decrypting, by the network device, the encrypted version of the classification input information to yield the classification input information; and passing, by the network device, the subsequently-received related inbound message and the classification input information to the application program that generated the related forwarded outbound message, thereby enabling the application program to use the classification input information when generating the message-specific classification input information for at least one subsequently-generated outbound message that relates to the subsequently-received related inbound message.

10. A computer-readable storage medium of claim 9, further comprising computer-readable program code for:

using, by the network device, the classification input information as decrypted to determine a transmission priority of the subsequently-received related inbound message; and using the determined priority during operation of the computer-usable program code for passing.

* * * * *